United States Patent
Shibahara et al.

(10) Patent No.: US 11,770,205 B2
(45) Date of Patent: Sep. 26, 2023

(54) OPTICAL SIGNAL PROCESSING APPARATUS, OPTICAL SIGNAL PROCESSING METHOD AND COMPUTER PROGRAM

(71) Applicant: NIPPON TELEGRAPH AND TELEPHONE CORPORATION, Tokyo (JP)

(72) Inventors: Koki Shibahara, Musashino (JP); Takayuki Mizuno, Musashino (JP); Yutaka Miyamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/638,830

(22) PCT Filed: Sep. 6, 2019

(86) PCT No.: PCT/JP2019/035265
§ 371 (c)(1),
(2) Date: Feb. 27, 2022

(87) PCT Pub. No.: WO2021/044632
PCT Pub. Date: Mar. 11, 2021

(65) Prior Publication Data
US 2022/0329343 A1 Oct. 13, 2022

(51) Int. Cl.
*H04B 10/06* (2006.01)
*H04J 14/04* (2006.01)
*H04B 10/60* (2013.01)

(52) U.S. Cl.
CPC ............. *H04J 14/04* (2013.01); *H04B 10/60* (2013.01)

(58) Field of Classification Search
CPC .......... H04J 14/04; H04J 14/02; H04B 10/60; H04B 10/6161; H04B 10/616;
(Continued)

(56) References Cited

U.S. PATENT DOCUMENTS

| 2015/0086201 A1* | 3/2015 | Ryf | H04B 10/2581 |
| | | | 398/44 |
| 2016/0043826 A1* | 2/2016 | Zhou | H04J 14/02 |
| | | | 398/44 |

OTHER PUBLICATIONS

Masashi Tanaka et al., "Fast Projection Algorithm and its Step Size Control", IEEE, 1995, vol. 2, pp. 945-948.
(Continued)

*Primary Examiner* — Hanh Phan
(74) *Attorney, Agent, or Firm* — Harness, Dickey & Pierce, P.L.C.

(57) ABSTRACT

An optical signal processing apparatus of an embodiment is an optical signal processing apparatus for separating and detecting an optical signal transmitted in a mode division multiplexing optical communication method by signal processing based on a multi-input multi-output (MIMO)-type linear filter. The device includes a signal processing unit configured to estimate weighting factors of the MIMO-type linear filter by sequential calculation based on an affine projection method. In the sequential calculation of the signal processing device, an output signal by the sequential calculation is expressed by a correlation vector indicating a correlation between the plurality of input signals, a smoothing prefilter vector indicating, of smoothing prefilter factors indicating a relationship between the weighting factors at current time and input signals from a first time being a past predetermined time to the current time, smoothing prefilter factors corresponding to each time from the first time to a
(Continued)

second time that corresponds to an affine projection order in the affine projection method, and input signals from the first time to the second time.

8 Claims, 7 Drawing Sheets

(58) Field of Classification Search
CPC ............ H04B 10/2581; H04B 10/2513; H04B 10/2507; H04B 10/40; H04B 10/58; H04B 10/6971; H04B 10/6972
USPC ... 398/44, 79, 202, 208, 209, 135, 136, 158, 398/159, 137, 138, 139, 33, 38, 25, 26, 398/27, 28
See application file for complete search history.

(56) References Cited

OTHER PUBLICATIONS

Guanghui He et al., "A Novel Approach for Mimo Adaptive Equalization Based on Affine Projection Algorithm", IEEE, 2006.
Won Cheol Lee, "Space-Time Adaptive Decision-Directed Equalizer Based on NLMS-Like Affine Projection Algorithm Using Iterative Hyperplane Projection", IEEE Transactions on Vehicular Technology, vol. 56, No. 5, 2007.
Felix Albu et al., "The Gauss-Seidel Fast Affine Projection Algorithm", IEEE, 2002.

\* cited by examiner

Fig. 1

| Algorithm 1 MIMO-APA (CONVENTIONAL METHOD) |
|---|
| 1:   for $i = 1$ to $N_R$ do |
| 2:     $X_i(k) = \begin{bmatrix} x_i(k) & X_{i,1:p-1}(k-1) \end{bmatrix}$ |
| 3:   end for |
| 4:   $e(k) = d(k) - \sum_{i=1}^{N_R} w_i^H(k-1)X_i(k)$ |
| 5:   $R(k) = \sum_{i=1}^{N_R} X_i^H(k)X_i(k)$ |
| 6:   $R_{inv}(k) = R^{-1}(k)$ |
| 7:   $g(k) = R_{inv}(k)e^*(k)$ |
| 8:   $g'(k) = \mu g(k)$ |
| 9:   for $i = 1$ to $N_R$ do |
| 10:    $\Delta w_i(k) = X_i(k)g'(k)$ |
| 11:    $w_i(k) = w_i(k-1) + \Delta w_i(k)$ |
| 12:   end for |

Fig. 2

| | |
|---|---|
| SIMO IN TOTAL | $N_R(p^2 + 2p)L + p^3/6 + p^2 + p$ |
| MIMO IN TOTAL | $(N_R p^2 + 2N_T N_R p)L + p^3/6 + N_T p^2 + N_T p$ |

Fig. 4

Algorithm 2 Fast MIMO-APA (FIRST EMBODIMENT METHOD)

1: for $i = 1$ to $N_R$ do
2: $\quad r_i(k) = r_i(k-1) + x_i^*(k)X_{i|1,:}(k) - x_i^*(k-L)X_{i|k-L+1,:}(k-1)$
3: end for
4: update $R(k)$, and compute $R_{\text{inv}}(k) = R^{-1}(k)$
5: $\hat{y}(k) = \sum_{i=1}^{N_R}\left[x_i^H(k)z_i(k-1) + r_{i|1:p-1}(k)s_{|1:p-1}(k-1)\right]$
6: $e(k) = \begin{bmatrix} y(k) - \hat{y}(k) \\ (1-\mu)e_{|1:p-1}(k-1) \end{bmatrix}$
7: $g(k) = R_{\text{inv}}(k)e^*(k)$
8: $g'(k) = \mu g(k)$
9: $s(k) = \begin{bmatrix} 0 \\ s_{|1:p-1}(k-1) \end{bmatrix} + g'(k)$
10: for $i = 1$ to $N_R$ do
11: $\quad z_i(k) = z_i(k-1) + s_{|p}(k)x_i(k-p+1)$
12: end for

Fig. 5

| | |
|---|---|
| SIMO IN TOTAL | $2N_R L + p^3/6 + p^2 + 3(N_R+1)p - N_R - 1$ |
| MIMO IN TOTAL | $2N_T N_R L + p^3/6 + N_T p^2 + (3N_T + 2N_R + N_T N_R)p - N_T N_R - N_T$ |

Fig. 7

| Algorithm 3 Fast MIMO-APA (SECOND EMBODIMENT) |
|---|
| 1: $X_{\text{Head}}(k) = [\phi(k) \quad X_{\text{Head}|1:p-1}(k-1)]$ |
| 2: $X_{\text{Tail}}(k) = [\phi(k-L+1) \quad X_{T|1:p-1}(k-1)]$ |
| 3: $j_1 = k \pmod{p}$ |
| 4: $j_2 = k-1 \pmod{p}$ |
| 5: $\tilde{X}_{|:,j_1+1}(k) = \Phi(k)$ |
| 6: $r(k) = r(k-1) + X_{\text{Head}|:,1}^H(k)X_{\text{Head}}(k) - X_{\text{Tail}|:,1}^H(k-1)X_{\text{Tail}}(k-1)$ |
| 7: update $R(k)$, and compute $R_{\text{inv}}(k) = R^{-1}(k)$ |
| 8: $\hat{y}(k) = \Phi^H(k)z(k-1) + r_{|1:p-1}(k)s_{|1:p-1}(k-1)$ |
| 9: $e(k) = \begin{bmatrix} y(k) - \hat{y}(k) \\ (1-\mu)e_{|1:p-1}(k-1) \end{bmatrix}$ |
| 10: $g(k) = R_{\text{inv}}(k)e^*(k)$ |
| 11: $g'(k) = \mu g(k)$ |
| 12: $s(k) = \begin{bmatrix} 0 \\ s_{|1:p-1}(k-1) \end{bmatrix} + g'(k)$ |
| 13: $z(k) = z(k-1) + s_{|p}(k)\tilde{X}_{|:,j_2+1}(k)$ |

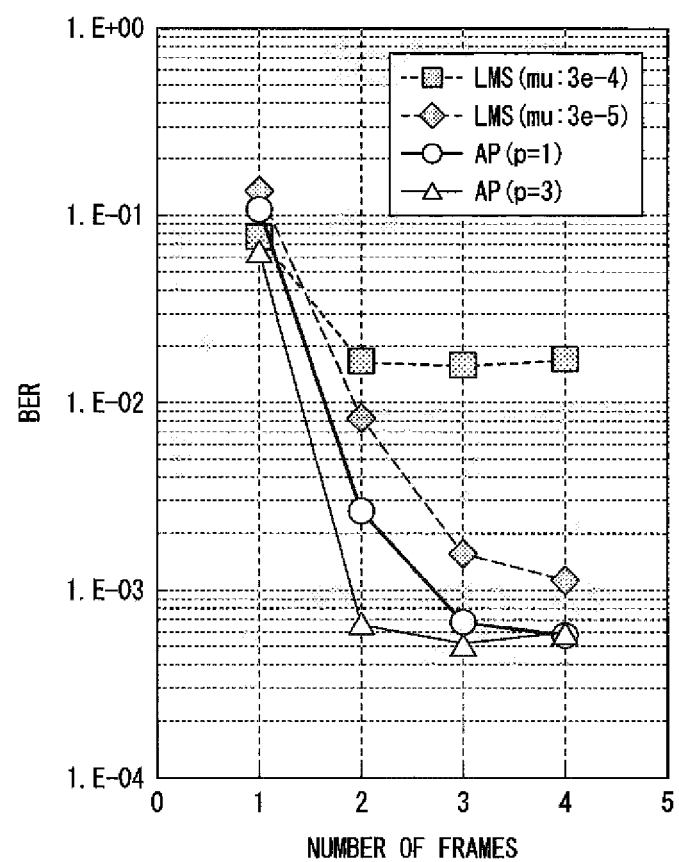

OPTICAL SIGNAL PROCESSING APPARATUS, OPTICAL SIGNAL PROCESSING METHOD AND COMPUTER PROGRAM

CROSS-REFERENCE TO RELATED APPLICATIONS

This application is a 371 U.S. National Phase of International Application No. PCT/JP2019/035265 filed on Sep. 6, 2019. The entire disclosure of the above application is incorporated herein by reference.

TECHNICAL FIELD

The present, invention relates to a technique for separating and detecting an optical signal transmitted in a mode division multiplexing optical communication method by signal processing based on a multi-input multi-output (MIMO)-type linear filter.

BACKGROUND ART

Communication traffic continues to increase year by year along with rapid development of broadband services due to the recent spread of optical fiber communications. Capacity enlargement of optical networks corresponding to the rapid increase of communication traffic has been realized by capacity enlargement of devices constituting optical communication systems without changing structures of optical fibers, so far. The optical fibers underlying current large-capacity optical networks are single-mode fibers. Each of the single-mode fibers is an optical fiber that has one core serving as a transmission path for optical signals and transmits optical signals each being excited only in one mode. With these optical fibers, optical networks for transmitting the capacity of several terabits per second can be realized over a long distance.

However, encountering the increase rate of recent communication traffics raises an issue of further expansion in transmission capacity. An optical fiber having a core capable of propagating optical signals of a plurality of modes is referred to as a multi-mode fiber. If the multi-mode fiber is used as a transmission medium, the transmission capacity per fiber can be increased by an amount of the number of modes to be used, in principle. However, from the reason that optical signals propagating in the multi-mode fiber are coupled between different modes or the difference in group delay is generated due to propagation constant unique to each propagation mode, a large distortion occurs in the signal waveform after transmission. Therefore, the multi-mode fiber was considered to be unsuitable for long distance transmission and has been used limitedly as a transmission medium mainly dedicated to short distance communication such as LAN (Local Area Network).

However, in recent years, research and development of mode division multiplexing optical communication methods that intend to use multi-mode fibers for enabling long distance transmission is actively conducted. What are mentioned as causes of the above includes development of optical amplifiers and multi/demultiplexers for multi-mode transmission, research on multiple-input multiple-output (MIMO) signal processing technique used in wireless communication systems, and progress of practical application of integrated circuits to which the above technique is applied. If mode division multiplexing optical communication methods using multi-mode fibers as transmission media are practically applied, there will be a possibility that further capacity enlargement for further long distance transmission can be realized.

In order to put the mode division multiplexing optical communication method into practice, a technique capable of stably transmitting optical signals over a long distance is required. Specifically, in order to enable long distance transmission by mode division multiplexing optical communication, it is important to manage optical signals so as not to be deteriorated by a physical phenomenon such as inter-mode dispersion or mode dependent loss, or compensate for deteriorations having occurred. The mode dependent loss is a phenomenon that causes a variation in the loss amount of light intensity for each mode of a propagating optical signal. The mode dependent loss is generated, for example, in a multi-mode optical amplifier or a mode multiplexer/demultiplexer. To be exact, the phenomenon generated in a multi-mode optical amplifier is mode dependency gain. In the following description, the mode dependency gain is included in the mode dependent loss. Further, the practical application of the mode division multiplexing optical communication method is presumed to be a digital coherent transmission system to which an optical signal coherent transmission/reception technique and a digital signal processing technique are applied.

A plurality of optical signals to be transmitted in parallel is transmitted, by a multi-mode optical fiber over a long distance and then subjected to signal separation and detection that is performed by a MIMO signal processing unit on the reception side. As an algorithm for the signal separation and detection, a MIMO-type linear filter is currently used. Further, as a method for estimating weighting factors to be used in the MIMO-type linear filter, a learning management system (LMS) method based on a stochastic gradient method is currently studied from the viewpoint of circuit scale and processing delay. However, if the mode dependent loss occurs, orthogonality is lost between mode channels serving as parallel propagation paths, and correlation occurs between reception signals propagated in different modes. In other words, the generation of mode dependent loss colors the reception signals. It is known that the convergence speed of calculation for estimating weighting factors by the LMS method is governed by an eigenvalue distribution of a correlation matrix of input signals, and the convergence speed deteriorates particularly in the case of inputting colored signals. The deterioration in convergence speed induces an increase in transmission amount of training pattern in signal transmission, and as a result, induces deterioration of transmission efficiency.

In addition, as a linear filter design method (weighting factor estimation method) based on the viewpoint different from circuit scale and processing delay, a sequential least square (recursive least square: RLS) method is known. The RLS method enables quick convergence without any influence by the eigenvalue distribution of the correlation matrix of input signals, but is characteristic in that the calculation amount per output symbol is proportional to the square of weighting factor length (filter length) L (namely $O(L^2)$). The calculation amount is $O(L)$ in the LMS method. Therefore, from the viewpoint of calculation amount, the RLS method is disadvantageous in implementation as compared with the LMS method. Further, it is known that the RLS method, when implemented with finite precision, involves numerical instability.

As another approach using a stochastic gradient method other than the LMS method in linear filter design, an affine projection method (affine projection algorithm: APA) is known. The APA can achieve improvement against the reduction in convergence speed of weighting factor estimation by the color property of input signals, by performing projection to a space stretched with present input signals and past (p−1) input signals. The calculation amount of APA is $O(p^2L)$. Therefore, the APA can be positioned as an intermediate approach between the LMS method and the RLS method in both calculation amount and convergence property. Here, p is an affine projection order. Further, hereinafter, in order to assume a system of L>>p, as an application to communication using broadband signals, the order of calculation amount is evaluated in the term of L. According to Non-Patent Literature 1, it is disclosed that utilizing time shift characteristic of input signal and constraint on of APA can reduce the above-mentioned calculation amount to $O(L)$, and the APA can be applied with the signal processing amount that is less influenced by the increase of p.

As described above, in the mode division multiplexing optical communication method, the color property of reception signal (hereinafter, the reception signal is referred to as an input signal in the sense of input signal to the linear filter) induces a problem of the reduction in convergence speed in the MIMO signal processing. Therefore, there is a possibility that using the APA in the linear filter design can achieve improvement against the reduction in convergence speed.

CITATION LIST

Non-Patent Literature

Non-Patent Literature 1: M. Tanaka, Y. Kaneda, S. Makino and J. Kojima, "Fast projection algorithm and its step size control," 1995 International Conference on Acoustics, Speech, and Signal Processing, Detroit, Mich., USA, 1995, pp. 945-948 vol. 2. doi: 10.1109/ICASSP.1995.480331

Non-Patent Literature 2: He, Guanghui, and Zucheng Zhou. "A novel approach for MIMO adaptive equalization based on affine projection algorithm." 2006 First International Conference on Communications and Networking in China. IEEE, 2006.

Non-Patent Literature 3: Lee, Won Cheol. "Space-time adaptive decision-directed equalizer based on NLMS-like affine projection algorithm using iterative hyperplane projection." IEEE Transactions on Vehicular Technology 56.5 (2007): 2790-2797.

Non-Patent Literature 4: Albu, Felix, et al. "The Gauss-Seidel fast affine projection algorithm." IEEE Workshop on Signal Processing Systems. IEEE, 2002.

SUMMARY OF THE INVENTION

Technical Problem

However, the APA method is a technique originally developed in the field of speech processing, and there are few examples applied to the field of communications using the MIMO technique. For example, in Non-Patent Literature 2, a MIMO-type decision feedback equalization method using APA is proposed, but the amount of calculation is still $O(p^2L)$, and if p is increased, the amount of calculation increases in proportion to its square. Further, according to Non-Patent Literature 3, it is proposed to reduce the amount of calculation by applying APA of substantially p=1 equivalent to normalized LMS after a single-input multiple-output (SIMO) input signal is converted and the color property is lowered. However, this method remains at achievement of the calculation amount $O(KpL)$ proportional to the repetition number K of the above conversion and the order p. Namely, in this case, the amount of calculation increases in proportion not only to p but also to the number of repetitions.

As described above, up until now, in the MIMO signal processing, a system for achieving the calculation amount $O(L)$ utilizing time shift characteristic of input signal and not relying on p, as illustrated in Non-Patent Literature 1, is not yet studied. What is considered as one of the causes is that, in the MIMO signal processing, such a time shift characteristic in which input signals at time (k−1) and time k are shifted by one sample is not secured.

In view of the above circumstances, the present invention intends to provide a technique for realizing a high-speed MIMO type affine projection method that is less influenced by an affine projection order p in the MIMO signal processing.

Means for Solving the Problem

An aspect of the present invention is an optical signal processing apparatus for separating and detecting an optical signal transmitted in a mode division multiplexing optical communication method by signal processing based on a multi-input multi-output (MIMO)-type linear filter, wherein the optical signal processing apparatus includes a signal processing unit configured to estimate weighting factors of the MIMO-type linear filter by sequential calculation based on an affine projection method, and in the sequential calculation, an output signal by the sequential calculation is expressed by a correlation vector indicating a correlation between the plurality of input signals, a smoothing prefilter vector indicating, of smoothing prefilter factors indicating a relationship between the weighting factors at current time and input signals from a first time being a past predetermined time to the current time, smoothing prefilter factors corresponding to each time from the first time to a second time that corresponds to an affine projection order in the affine projection method, and input signals from the first time to the second time.

An aspect of the present invention is an optical signal processing method for separating and detecting an optical signal transmitted in a mode division multiplexing optical communication method by signal processing based on a multi-input multi-output (MIMO)-type linear filter, wherein the optical signal processing method includes a signal processing step of estimating weighting factors of the MIMO-type linear filter by sequential calculation based on an affine projection method, and in the sequential calculation, an output signal by the sequential calculation is expressed by a correlation vector indicating a correlation between the plurality of input signals, a smoothing prefilter vector indicating, of smoothing prefilter factors indicating a relationship between the weighting factors at current time and input signals from a first time being a past predetermined time to the current time, smoothing prefilter factors corresponding to each time from the first time to a second time that corresponds to an affine projection order in the affine projection method, and input signals from the first time to the second time.

An aspect of the present invention is a computer program causing a computer functioning as an optical signal processing apparatus for separating and detecting an optical signal transmitted in a mode division multiplexing optical communication method by signal processing based on a multi-input multi-output (MIMO)-type linear filter to execute, a signal processing step of estimating weighting factors of the MIMO-type linear filter by sequential calculation based on an affine projection method, and in the sequential calculation, an output signal by the sequential calculation is expressed by a correlation vector indicating a correlation between the plurality of input signals, a smoothing prefilter vector indicating, of smoothing prefilter factors indicating a relationship between the weighting factors at current time and input signals from a first time being a past predetermined time to the current time, smoothing prefilter factors corresponding to each time from the first time to a second time that corresponds to an affine projection order in the affine projection method, and input signals from the first time to the second time.

Effects of the Invention

According to the present invention, in the MIMO signal processing, a high-speed MIMO type affine projection method that is less influenced by the affine projection order p can be realized.

BRIEF DESCRIPTION OF DRAWINGS

FIG. 1 is a diagram illustrating a specific example of a sub-filter style MIMO type affine projection method.

FIG. 2 is a diagram illustrating a specific example of frequency of complex multiplication by the sub-filter style MIMO type affine projection method.

FIG. 4 is a diagram illustrating a specific example of algorithm of a high-speed MIMO type affine projection method that can be realized by the signal processing unit 1 provided in the optical signal processing apparatus according to the first embodiment.

FIG. 5 is a diagram illustrating a specific example of frequency of complex multiplication in the high-speed MIMO type affine projection method of the first embodiment.

FIG. 7 is a diagram illustrating a specific example of algorithm of high-speed MIMO type affine projection method that can be realized by the signal processing unit 1a provided in the optical signal processing apparatus according to the second embodiment.

FIG. 9 is a diagram illustrating experimental results of an optical transmission experiment performed using the high-speed MIMO type affine projection method of the first embodiment or the second embodiment.

DESCRIPTION OF EMBODIMENTS

Figure 3:
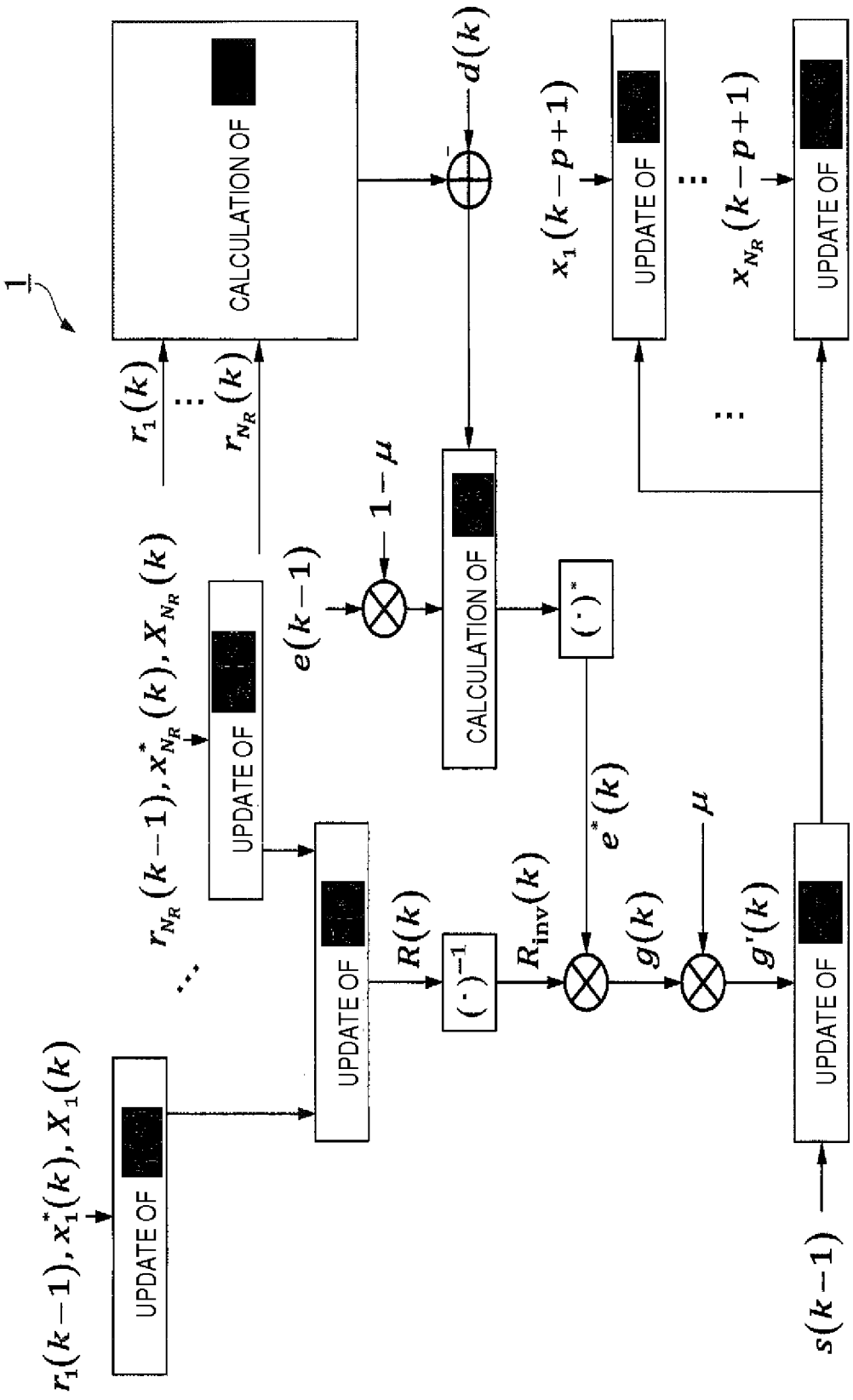
FIG. 3 is a diagram illustrating a specific example of functional configuration of a signal processing unit 1 provided in an optical signal processing apparatus according to a first embodiment.

Hereinafter, an embodiment of the present invention will be described with reference to attached drawings.

First, as a method for designing a MIMO-type linear filter, derivation of a sub-filter style MIMO type affine projection method, which is one of conventional methods, will be described. Here, the sub-filter style means a style that causes a weight $w_i(k)$ functioning as a filter to act on each of a plurality of ($N_R$ in total) input signals. Hereinafter, the sub-filter style MIMO type affine projection method is shown as preliminary preparation for deriving a linear filter design method in the present embodiment.

In an assumed MIMO system, the number of transmission streams is $N_T$, and the number of reception streams is $N_R$. Here, an input signal vector $[x_i(k)]$ represents time-sequential collection of i-th input signal $x_i(k)$ at time k, and the collection of $[x_i(k)]$ from past time $(k-p+1)$ to time k is defined by expression (1) that is referred to as an input signal matrix $X_i(k)$.

Here, $[x_i(k)]$ means a vector based on element $x_i(k)$. Such notation is made taking it into consideration that, while difference between the vector $[x_i(k)]$ and the element $x_i(k)$ can be represented by difference in typeface between the same symbols without [ ] in the mathematical expression, such distinction by typeface without use of [ ] is not possible in the text. Such notational distinction in the text shall be the same for the following other symbols. However, when it is unnecessary to indicate the distinction between the two in the text, or when the distinction is clear, there will be a case of omitting the notation [ ] even for the vector. Further, in mathematical expressions in the text described below and mathematical expressions in the drawings, the notation of subscripts indicating matrix or vector elements basically follows MATLAB (registered trademark) notation.

[Math. 1]

$$X_i(k) = [\,x_i(k)\;\; x_i(k-1)\;\; \ldots\;\; x_i(k-p+1)\,] = \begin{bmatrix} x_i(k) & x_i(k-1) & \ldots & x_i(k-p+1) \\ x_i(k-1) & x_i(k-2) & \ldots & x_i(k-p) \\ \vdots & \vdots & \ddots & \vdots \\ x_i(k-L+1) & x_i(k-L) & \ldots & x_i(k-p-L+2) \end{bmatrix} \quad (1)$$

Further, like the input signal, d(k) represents a desired signal at time k, and the collection of d(k) from past time $(k-p+1)$ to time k is defined by expression (2) that is referred to as a desired signal vector $[(d(k)]$.

[Math. 2]

$$d(k)=[d(k)\,d(k-1)\,\ldots\,d(k-p+1)]^T \quad (2)$$

The desired signal in expression (2) can be obtained as a training signal, or an output signal obtained by separation and detection of the input signal through filter processing.

On the other hand, when $w_i(k)$ represents a weighting factor vector for the i-th input signal, the MIMO type affine projection method results in obtaining $w_i(k)$ satisfying an optimization problem of expression (3).

[Math. 3]

$$\text{minimize} \sum_{i=1}^{N_R} \|w_i(k) - w_i(k-1)\|^2 \text{ subject to } w_i^H(k)X_i(k) = d(k) \qquad (3)$$

Here, $w_i^H(k)$ represents complex conjugate translocation of $w_i(k)$. Expression (3) can be solved using method of Lagrange multiplier. A cost function including an undetermined constant vector $\lambda$ is defined by expression (4).

[Math. 4]

$$J = \sum_{i=1}^{N_R} \|w_i(k) - w_i(k)\|^2 + Re\left[[d(k) - w_i^H(k)X_i(k)]\lambda^*\right] \qquad (4)$$

Here, $\lambda^*$ represents a complex conjugate of $\lambda$. Differentiating J with each $w_i(k)$ can obtain the sub-filter style MIMO type affine projection method expressed by the following expressions (5) to (10).

[Math. 5]

$$\hat{y}(k) = \sum_{i=1}^{N_R} w_i^H(k-1)x_i(k) \qquad (5)$$

[Math. 6]

$$e(k) = d(k) - \sum_{i=1}^{N_R} w_i^H(k-1)X_i(k) \qquad (6)$$

[Math. 7]

$$R_i(k) = X_i^H(k)X_i(k) \qquad (7)$$

[Math. 8]

$$g(k) = \left(\sum_{i=1}^{N_R} R_i(k)\right)^{-1} e^*(k) \qquad (8)$$

[Math. 9]

$$\Delta w_i(k) = \mu X_i(k)g(k) \qquad (9)$$

[Math. 10]

$$w_i(k) = w_i(k-1) + \Delta w_i(k) \qquad (10)$$

Here, $\mu$ represents a step size parameter. Expression (5) is a mathematical expression for obtaining an objective output signal $\hat{y}(k)$. Expressions (6) to (10) are mathematical expressions for updating $w_i(k)$ to obtain the output signal at the next time k+1. Here, "ŷ" means a symbol with "^" above y. FIG. 1 is a diagram in which expressions (5) to (10) are expressed in an algorithm form. Of steps 1 to 12 illustrated in FIG. 1, the fourth step (output and error calculation), the fifth step (correlation matrix calculation), the tenth step (weight update) are dominant in determining the amount of calculation under the condition of L>>p, and the frequency of complex multiplication is $N_R pL$, $N_R p^2 L$, and $N_R pL$, respectively. $X_{i:, 1:p-1}(k-1)$ in step 2 represents a matrix consisting of components from the first column to the (p−1)th column of an input signal matrix $X_i(k-1)$.

Accordingly, in each of SIMO-type and MIMO-type structures, the total number of times of multiplications per symbol output is as illustrated in FIG. 2. Deriving such a sub-filter style MIMO type affine projection method can secure the time shift characteristic of input signals even in the case of the MIMO type, and reduction in calculation amount (namely, speeding up) can be realized. Further, from FIG. 2, it is understood that, in any of the SIMO type and the MIMO type, the amount of calculation increases with increasing affine order p.

Based on the above, an embodiment of MIMO type affine projection method (hereinafter, referred to as "high-speed MIMO type affine projection method") capable of speedily estimating the weighting factors than the conventional sub-filter style MIMO type affine projection method will be described below.

First Embodiment

FIG. 3 is a diagram illustrating a specific example of functional configuration of a signal processing unit (signal processor) 1 provided in an optical signal processing apparatus according to a first embodiment. Further, FIG. 4 illustrates a specific example of algorithm of a high-speed MIMO type affine projection method (Fast MIMO-APA) that can be realized by the functional configuration illustrated in FIG. 3. In the high-speed MIMO type affine projection method, a correlation vector $r_i(k)$, a smoothing prefilter vector $s(k)$, and a deformation filter vector $z(k)$, which are auxiliary variables, are introduced in the conventional sub-filter style MIMO type affine projection method. Performing the same calculation as the sub-filter style MIMO type affine projection method after the introduction of the auxiliary variables can mainly reduce the frequency of complex multiplication in the calculation of respective variables.

Hereinafter, the definition and meaning each auxiliary variable will be described. First, the correlation vector $r_i(k)$ is defined by the following expression (11).

[Math. 11]

$$r_i(k) = [x_i^H(k)x_i(k)x_i^H(k)x_i(k-1) \ldots x_i^H(k)x_i(k-p+1)] \qquad (11)$$

Using $r_i(k)$ can avoid direct update processing by expression (7) in the update of R(k), and can reduce the amount of calculation correspondingly. Subsequently, a smoothing prefilter factor $s(j)(k)$ is defined by the following expression (12). This corresponds to a factor acting on $x_i(k-j+1)$.

[Math. 12]

$$w_i(k) = \sum_{j=1}^{k} s_{(j)}(k)x_i(k-j+1) \qquad (12)$$

In the update of $s(j)(k)$ at time k, no update occurs for $j \geq p+1$. Accordingly, about the update occurring $s(j)(k)$ ($1 \leq j \leq p$), what is collected in vector form is defined as the smoothing prefilter vector $s(k)$.

[Math. 13]

$$s(k) = [s_{(1)}(k)s_{(2)}(k) \ldots s_{(p)}(k)]^T \qquad (13)$$

Subsequently, the deformation filter vector $z_i(k)$ is defined by the following expression (14).

[Math. 14]

$$z_i(k) = \sum_{j=p}^{k} s_{(j)}(k) x_i(k-j+1) \quad (14)$$

Further, in the first embodiment, the signal processing unit 1 calculates an output $\hat{y}(k)$ using $r_i(k)$, $s(k)$, and $z(k)$ instead of $w_i(k)$. Specifically, the signal processing unit 1 uses the following expression (15) instead of expression (5).

[Math. 15]

$$\hat{y}(k) = \sum_{i=1}^{N_R} \left[ x_i^H(k) z_i(k-1) + r_{i|1:p-1}(k) s_{|1:p-1}(k-1) \right] \quad (15)$$

Here, as an expression representing components of an arbitrary matrix (or vector) A, it is assumed that $A_{|i,j}$ represents (i, j) components of A. Further, it is assumed that $A_{|i,:}$ represents the i-th row of A, and $A_{|:,j}$ represents the J-th column of A. That is, $r_{i|1:p-1}(k)$ in expression (15) represents a vector consisting of the first to (p–1)th components of the correlation vector $r_i(k)$, and $s_{|1:p-1}(k-1)$ represents a vector consisting of the first to the (p–1)th components of a smoothing prefilter vector $s(k-1)$. Further, $s_{|p}(k)$ in step 11 of FIG. 4 represents the p-th component of the smoothing prefilter vector $s(k)$. This expression method is applied similarly in the following mathematical expressions.

FIG. 5 is a diagram illustrating a specific example of the frequency of complex multiplication in the high-speed MIMO type affine projection method of the first embodiment. Like this, according to the high-speed MIMO type affine projection method of the present embodiment, the frequency is $2N_R p$ in the correlation matrix calculation of steps 1 to 3, $N_R(L+p-1)$ times in the output calculation of step 5, (p–1) times in the error calculation of step 6, and $N_R L$ times in the weight update of steps 10 to 12. Therefore, according to the high-speed MIMO type affine projection method of the first embodiment, it is possible to reduce the influence to the amount of calculation increasing according to the increase in the affine order p, as compared with the conventional sub-filter style MIMO type affine projection method.

Second Embodiment

Figure 6:
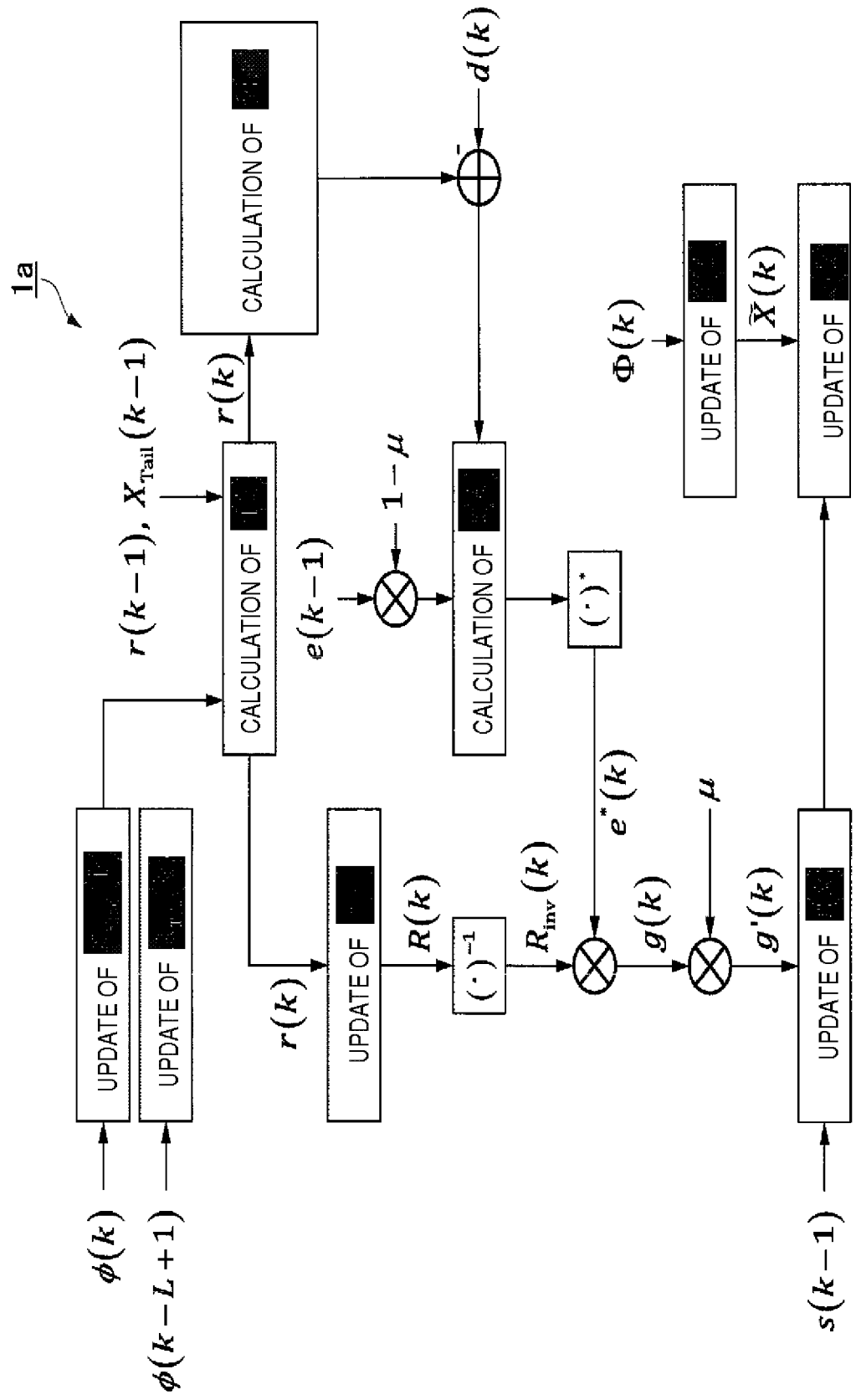
FIG. 6 is a diagram illustrating a specific example of functional configuration of a signal processing unit 1a provided in an optical signal processing apparatus according to a second embodiment.

FIG. 6 is a diagram illustrating a specific example of functional configuration of a signal processing unit (signal processor) 1a provided in an optical signal processing apparatus according to a second embodiment. Further, FIG. 7 illustrates an algorithm of high-speed MIMO type affine projection method (Fast MIMO-APA) that can be realized by the signal processing unit 1a illustrated in FIG. 6. The high-speed MIMO type affine projection method according to the second embodiment intends to remove loop processing from the high-speed MIMO type affine projection method in the first embodiment and reduce the number of accesses to a memory, thereby simplifying the operation.

Specifically, the following two points are changed for the high-speed MIMO type affine projection method in the first embodiment.

(1) For each variable, what has been defined for each stream (input signal of each mode) is defined in all streams by batch (deletion of loop processing).

(2) Input data-hold matrix $X\tilde{\,}(k)$ having the size of $(N_R L) \times p$ is prepared. At this time, note that only a part of the components of X(k) is used in output and update calculation according to the high-speed MIMO type affine projection method. Namely, this corresponds to defining only the partial matrix (vector) to be used as another variable for the purpose of reducing the number of extra accesses to the memory.

First, $\phi(k)$ and $\Phi(k)$ consisting of input signals are defined by the following expressions (16) and (17).

[Math. 16]

$$\phi(k) = \begin{bmatrix} X_1(k) \\ X_2(k) \\ \vdots \\ X_{N_R}(k) \end{bmatrix} \quad (16)$$

[Math. 17]

$$\Phi(k) = \begin{bmatrix} \phi(k) \\ \phi(k-1) \\ \vdots \\ \phi(k-L+1) \end{bmatrix} \quad (17)$$

Subsequently, $\Phi(k)$ is used to define the input data-hold matrix X(k) by the following expression (18).

[Math. 18]

$$X(k) = [\Phi(k) \Phi(k-1) \ldots \Phi(k-p+1)] \quad (18)$$

Here, the correlation vector r(k) is defined by the following expression (19). Note that the stream number i is not used in expression (19).

[Math. 19]

$$r(k) = [\Phi^H(k)\Phi(k) \Phi^H(k)\Phi(k-1) \ldots \Phi^H(k)\Phi(k-p+1)] \quad (19)$$

Next, in order to update r(k), $X_{Head}(k)$ and $X_{Tail}(k)$ are defined by the following expressions (20) and (21).

[Math. 20]

$$X_{Head}(k) = [\phi(k)\phi(k-1) \ldots \phi(k-p+1)] \quad (20)$$

[Math. 21]

$$X_{Tail}(k) = [\phi(k-L+1)\phi(k-L) \ldots \phi(k-p-L+2)] \quad (21)$$

Then, the definitional expressions of the expressions (20) and (21) can obtain the following expressions (22) to (24) as expressions for updating $X_{Head}(k)$, $X_{Tail}(k)$, and r(k).

[Math. 22]

$$X_{Head}(k) = \begin{bmatrix} \phi(k) & X_{Head|1:p-1}(k) \end{bmatrix} \quad (22)$$

[Math. 23]

$$X_{Tail}(k) = \begin{bmatrix} \phi(k-L+1) & X_{T|1:p-1}(k) \end{bmatrix} \quad (23)$$

[Math. 24]

$$z(k) = \sum_{j=p}^{k} s_{(j)}(k) \Phi(k-j+1) \quad (25)$$

The smoothing prefilter vector s(k) is defined in the same manner as in the first embodiment (expression (13)). Further, the deformation filter vector z(k) is defined by the following expression (25).

[Math. 25]

$$j_1 = k(\bmod p) \quad (26)$$

Here, note that, at time k, only two columns of the input data-hold matrix X(k) are used for output and update. Accordingly, the input data-hold matrix $\tilde{X}(k)$ having the size of $(N_R L) \times p$ is defined. Here, the symbol "$\tilde{X}$" represents a symbol including "~" attached above "X" in the mathematical expression. At time k, a certain column ($j_1$ column) of $\tilde{X}(k)$ is updated with $\Phi(k)$, and a certain color ($j_2$ column) is taken out and used to update z(k). Here $j_1$ and $j_2$ can be obtained by the following expressions (26) and (27).

[Math. 26]

$$j_1 = k(\bmod p) \quad (26)$$

[Math. 27]

$$j_2 = k - p + 1(\bmod p) = k + 1(\bmod p) \quad (27)$$

In expression (26), $j_1$ represents a remainder obtained by dividing k by p. Similarly, $j_2$ in expression (27) represents a remainder obtained by dividing k+1 by p. In this case, expressions for updating $\tilde{X}(k)$ and z(k) are given as the following expressions (28) and (29).

[Math. 28]

$$\tilde{X}_{1:,j_1+1}(k) = \Phi(k) \quad (28)$$

[Math. 29]

$$z(k) = z(k-1) + s_{(p)}(k)\tilde{X}_{1:,j_2+1}(k) \quad (29)$$

Here, adding 1 to each j is for correction from the consideration that only values from 0 to p−1 are obtained in (mod p). In this case, the number of times of multiplications is expressed similarly as in FIG. 5.

Figure 8:
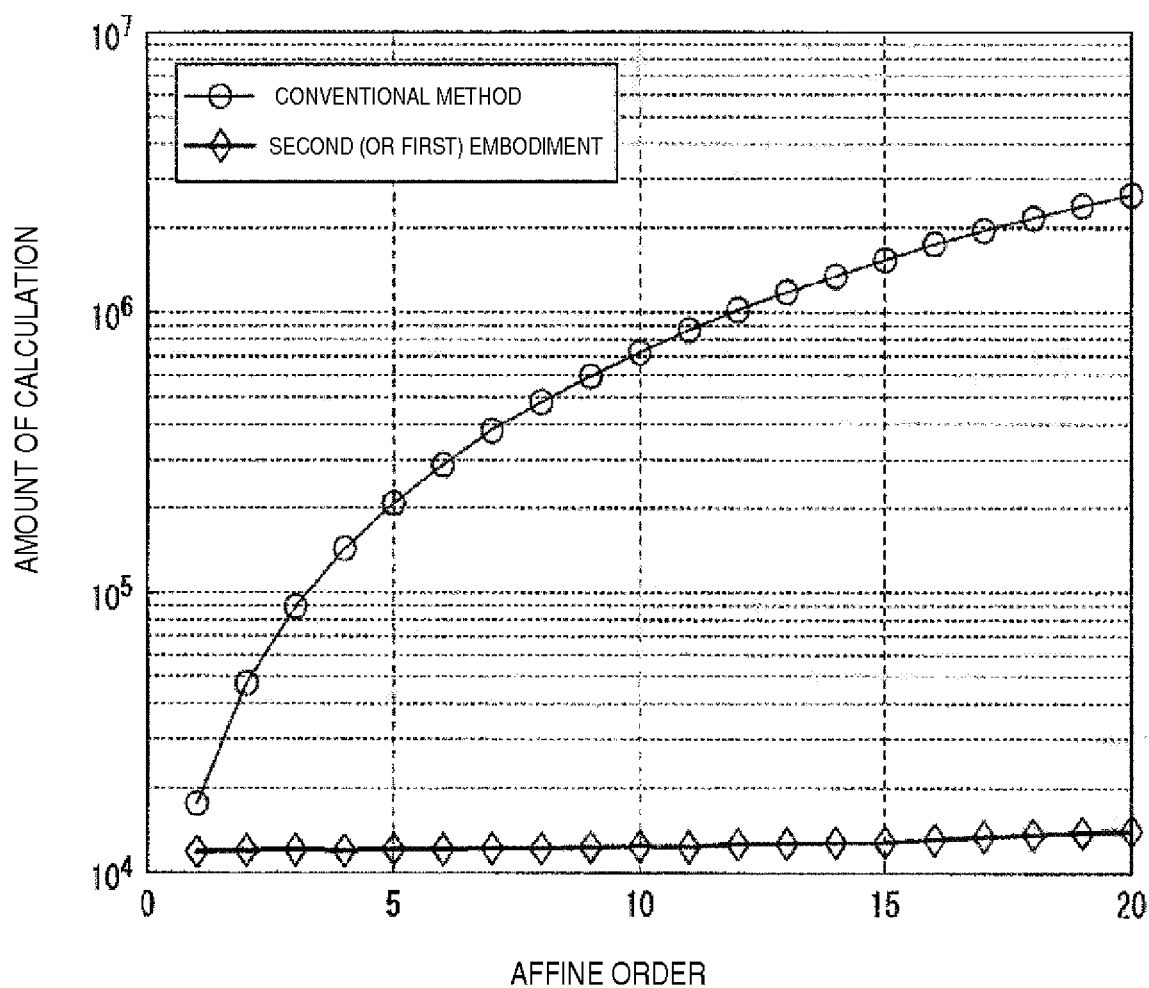
FIG. 8 is a diagram illustrating a specific example of effects that can be obtained by high-speed MIMO type affine projection method of the first embodiment or the second embodiment.

FIG. 8 is a diagram illustrating a specific example of effects obtained by the high-speed MIMO type affine projection method of the second embodiment (or the first embodiment). Specifically, FIG. 8 illustrates results of a simulation performed with filter length L=1000, $N_T$=1, and $N_R$=6. The horizontal axis represents the affine order p, and the vertical axis represents the amount of calculation. Here, the comparison in amount of calculation is performed between the conventional method (sub-filter style MIMO type affine projection method) and the second embodiment (or the first embodiment).

As understood from FIG. 8, in the conventional method, the amount of calculation increases largely with the order of $p^2$ as the affine order p increase, but the MIMO type affine projection method of the second embodiment (or the first embodiment) is less influenced by the affine order. For example, according to the example of FIG. 8, the amount of calculation can be reduced to approximately 2% in the case of affine order p=10.

The reason why the influence of affine order p slightly appears in the MIMO type affine projection method of the second embodiment (or the first embodiment) is because the inverse matrix operation is mainly the amount of calculation of $O(p^3)$. It is known that the amount of calculation of the inverse matrix operation can be reduced to O(p) by using a forward linear prediction filter or a rearward linear prediction filter based on the linear prediction method (for example, refer to Non-Patent Literature 1) or using the inverse matrix operation based on the Gauss-Seidel method (for example, refer to Non-Patent Literature 4).

However, the former has a problem of numerical instability, and the latter is an effective approximation when the step size is large. Therefore, it is determined in the present invention that the inverse matrix operation is directly performed instead of using these methods. Further, since the situation of L>>p is supposed in the application to the optical transmission, the amount of calculation of the inverse matrix operation does not become dominant as compared with the entire amount of calculation required for MIMO type affine projection method.

FIG. 9 is a diagram illustrating experimental results of an optical transmission experiment performed using the high-speed MIMO type affine projection method of the second embodiment (or the first embodiment). In the optical transmission experiment, it is determined to detect the leading frame from transmission data after transmission of 3000 km by a several-mode fiber carrying six independent modes. In FIG. 9, the horizontal axis represents the number of output frames. One frame is 30000 symbols. The vertical axis represents bit error rate (BER).

Although FIG. 9 illustrates, as the target to be compared, experimental results according to the LMS method based on the stochastic gradient method, the convergence of calculation is slow due to color property of the signal in the case of mu=3e−5 of the LMS method. It has not reached the convergence even after reception of the 4th frame from the leading side. Here, mu represents a step size parameter used in the stochastic gradient method. On the other hand, although the convergence of calculation becomes earlier in the case of mu=3e−4 of the LMS method, the error from Wiener's optimum solution becomes larger and, as a result, the bit error rate deteriorates.

On the other hand, according to the high-speed MIMO type affine projection method (AP in the drawing) of the second embodiment (or the first embodiment), it is possible to advance the convergence while suppressing the deterioration in bit error rate. In particular, in the case of affine order p=3, the calculation can be completed at the reception time of the second frame.

The optical signal processing apparatus or the signal processing unit according to the above-described embodiment may be realized by a computer. In that case, a program for realizing this function may be recorded on a computer readable recording medium, and causing a computer system to read the program recorded on this recording medium and execute the program, thereby realizing the device or unit. The "computer system" in this case is intended to include OS and hardware equipment, such as peripheral devices. Further, the "computer readable recording medium" is a portable medium such as a flexible disk, a magneto-optical disk, ROM, or CD-ROM, or a storage device such as a hard disk built in the computer system. Further, the "computer readable recording medium" may include a medium dynamically holding a program during a short period of time, like a communication line in the case of transmitting the program via a network such as Internet or a communication channel such as telephone network, and may include a medium holding the program for a predetermined time, like a volatile memory provided in a computer system serving as a server or a client, in that case. Further, the above-described program may be a program for realizing a part of the above-mentioned function, or a program capable of realizing the above-mentioned function when combined with a program recorded in the computer system, or may be a program that can be realized using a programmable logic device such as field programmable gate array (FPGA).

As mentioned above, although some embodiments of the present invention have been described in detail with reference to the drawings, specific configurations are not limited to these embodiments, and designs and the like not departing from the subject matter of the present invention are also included.

REFERENCE SIGNS LIST

1 . . . signal processing unit provided in optical signal processing apparatus of first embodiment

1a . . . signal processing unit provided in optical signal processing apparatus of second embodiment

The invention claimed is:

1. An optical signal processing apparatus for separating and detecting an optical signal transmitted in a mode division multiplexing optical communication method by signal processing based on a multi-input multi-output (MIMO)-type linear filter, wherein the optical signal processing apparatus comprises:
   a signal processor configured to estimate weighting factors of the MIMO-type linear filter by sequential calculation based on an affine projection method, and
   in the sequential calculation, an output signal by the sequential calculation is expressed by
   a correlation vector indicating a correlation between the plurality of input signals,
   a smoothing prefilter vector indicating, of smoothing prefilter factors indicating a relationship between the weighting factors at current time and input signals from a first time being a past predetermined time to the current time, smoothing prefilter factors corresponding to each time from the first time to a second time that corresponds to an affine projection order in the affine projection method, and
   input signals from the first time to the second time.

2. The optical signal processing apparatus according to claim 1, wherein the correlation vector $r_i(k)$ is expressed by expression (1), based on identifier i identifying a plurality of optical signals input to the MIMO-type linear filter, time k, the affine projection order p, and the weighting factor $w_i(k)$ corresponding to the i-th optical signal at time k, $$r_i(k)=[x_i^H(k)x_i(k)\, x_i^H(k)x_i(k-1) \ldots x_i^H(k)x_i(k-p+1)] \quad (1)$$

the smoothing prefilter factor s(j)(k) is expressed by expression (2), $$s(k)=[s_{(1)}(k)s_{(2)}(k) \ldots s_{(p)}(k)]^T \quad (2)$$

and, the output signal is expressed using a deformation filter vector $z_i(k)$ expressed by expression (3) according to expression (4), $$z_i(k) = \sum_{j=p}^{k} s_{(j)}(k)x_i(k-j+1) \quad (3)$$

$$\hat{y}(k) = \sum_{i=1}^{N_R}[x_i^H(k)z_i(k-1) + r_{i|1:p-1}(k)s_{|1:p-1}(k-1)]. \quad (4)$$

3. The optical signal processing apparatus according to claim 2, wherein in updating each value in the sequential calculation and calculating the output signal, the signal processor uses a partial input signal vector constituted by a specific column vector extracted from the input signal vector.

4. The optical signal processing apparatus according to claim 3, wherein the specific column vector is constituted by column vectors of $j_1$ column and $j_2$ column of the input signal vector, and the $j_1$ and $j_2$ are expressed by expressions (5) and (6).

$$j_1 = k(\bmod p) \quad (5)$$

$$j_2 = k - p + 1(\bmod p) = k + 1(\bmod p). \quad (6)$$

5. The optical signal processing apparatus according to claim 4, wherein the partial input signal vector X~(k) and the deformation filter vector z(k) are updated with the input signal vector as Φ(k) according to expressions (7) and (8), $$x_{1:j_1+1}(k)=\Phi(k) \quad (7)$$

$$z(k)=z(k-1)+s_{(p)}(k)\tilde{X}_{1:j_2+1}(k) \quad (8).$$

6. The optical signal processing apparatus according to claim 1, wherein the correlation vector and the smoothing prefilter vector are calculated by vector operation using an input signal vector including a plurality of input signals from the first time to the current time.

7. An optical signal processing method for separating and detecting an optical signal transmitted in a mode division multiplexing optical communication method by signal processing based on a multi-input multi-output (MIMO)-type linear filter, wherein the optical signal processing method comprises:
   estimating weighting factors of the MIMO-type linear filter by sequential calculation based on an affine projection method, and
   in the sequential calculation, an output signal by the sequential calculation is expressed by
   a correlation vector indicating a correlation between the plurality of input signals,
   a smoothing prefilter vector indicating, of smoothing prefilter factors indicating a relationship between the weighting factors at current time and input signals from a first time being a past predetermined time to the current time, smoothing prefilter factors corresponding to each time from the first time to a second time that corresponds to an affine projection order in the affine projection method, and
   input signals from the first time to the second time.

8. A non-transitory computer-readable storage medium that stores a computer program when executed by a computer causing the computer functioning as an optical signal processing apparatus for separating and detecting an optical signal transmitted in a mode division multiplexing optical communication method by signal processing based on a multi-input multi-output (MIMO)-type linear filter to execute,
   estimating weighting factors of the MIMO-type linear filter by sequential calculation based on an affine projection method, and
   in the sequential calculation, an output signal by the sequential calculation is expressed by
   a correlation vector indicating a correlation between the plurality of input signals, a smoothing prefilter vector indicating, of smoothing prefilter factors indicating a relationship between the weighting factors at current time and input signals from a first time being a past predetermined time to the current time, smoothing prefilter factors corresponding to each time from the first time to a second time that corresponds to an affine projection order in the affine projection method, and
input signals from the first time to the second time.

* * * * *